(12) United States Patent
Wu et al.

(10) Patent No.: US 10,459,476 B2
(45) Date of Patent: Oct. 29, 2019

(54) ACTUATOR MANUAL OVERRIDE DEVICE

(71) Applicant: Aktiebolaget SKF, Gothenburg (SE)

(72) Inventors: Adong Wu, Pinghu (CN); Malt Mei, Pinghu (CN)

(73) Assignee: Aktiebolaget SKF, Gothenburg (SE)

( * ) Notice: Subject to any disclaimer, the term of this patent is extended or adjusted under 35 U.S.C. 154(b) by 321 days.

(21) Appl. No.: 15/388,850

(22) Filed: Dec. 22, 2016

(65) Prior Publication Data

US 2018/0181159 A1  Jun. 28, 2018

(51) Int. Cl.
```
F16K 31/05      (2006.01)
G05G 1/08       (2006.01)
F16H 25/20      (2006.01)
```
(52) U.S. Cl.
CPC ............... *G05G 1/08* (2013.01); *F16H 25/20* (2013.01); *F16H 2025/2065* (2013.01); *F16H 2025/2081* (2013.01)

(58) Field of Classification Search
CPC ... G01G 1/08; F16H 2025/2065; F16H 25/20; F16H 2025/2081
See application file for complete search history.

(56) References Cited

U.S. PATENT DOCUMENTS

| | | | | |
|---|---|---|---|---|
| 4,719,816 | A * | 1/1988 | Carlnas | F16H 25/20 475/3 |
| 5,053,685 | A * | 10/1991 | Bacchi | F16H 25/20 310/80 |
| 6,223,971 | B1 * | 5/2001 | Sato | B23K 11/31 228/12 |
| 6,603,228 | B1 * | 8/2003 | Sato | B23K 11/31 310/12.32 |
| 2008/0184828 | A1 * | 8/2008 | Chen | F16H 25/20 74/25 |
| 2012/0019109 | A1 * | 1/2012 | Rosengren | H02K 7/00 310/75 B |
| 2014/0174225 | A1 * | 6/2014 | Wu | F16H 25/20 74/89.39 |
| 2014/0182403 | A1 * | 7/2014 | Wu | F16H 25/20 74/89.23 |

* cited by examiner

*Primary Examiner* — Jake Cook
(74) *Attorney, Agent, or Firm* — Laurence A. Greenberg; Werner H. Stemer; Ralph E. Locher

(57) ABSTRACT

An override device is for an actuator having a casing, a motor disposed within the casing and having a shaft rotatable about a central axis, and an output member drivably coupled with the motor shaft. The override device comprises a body having an outer portion engageable with the casing to couple the body with the actuator and an inner portion engageable with the motor shaft. As such, angular displacement of the override body angularly displaces the shaft about the shaft central axis so as to drive the output member. Preferably, the body outer portion includes an annular rim, the body inner portion includes a hub with a socket for receiving the motor shaft end and the body further includes a disk-like intermediate portion extending radially between and integrally connecting the hub and rim.

20 Claims, 5 Drawing Sheets

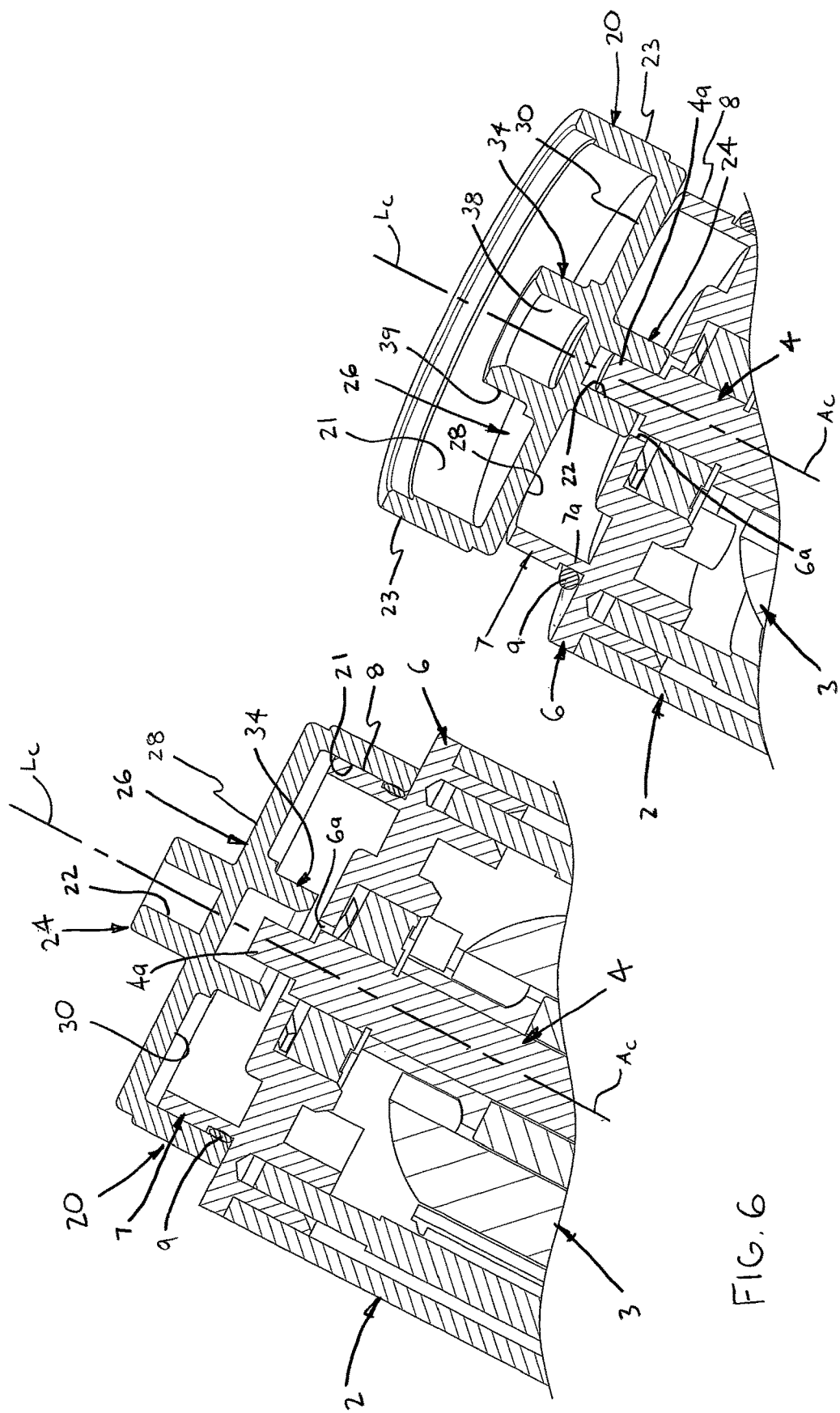

ACTUATOR MANUAL OVERRIDE DEVICE

BACKGROUND OF THE INVENTION

The present invention relates to actuators, and more particularly to devices for manually driving actuators Actuators including motors and output members, such as a linearly displaceable shaft or rod, are known and are generally used to drive a mechanism. In certain actuators, an electric motor drives a linearly displaceable output rod through a gear set and a lead screw. When there an issue with a motor, such as loss of power or a structural failure (e.g., burned-out windings), the output rod and any mechanism operated thereby may become seized or "stuck". To free such an actuator and mechanism, a special tool is typically required to drive the lead screw to displace the output rod, which often requires a substantial amount of force or torque.

SUMMARY OF THE INVENTION

In one aspect, the present invention is an override device for an actuator having a casing, a motor disposed within the casing and having a shaft rotatable about a central axis, and an output member drivably coupled with the motor shaft. The override device comprises a body having an outer portion engageable with the casing to couple the body with the actuator and an inner portion engageable with the motor shaft. When the inner portion is engaged with the motor shaft, angular displacement of the override body angularly displaces the shaft about the shaft central axis so as to drive the output member.

In another aspect, the present invention is again an override device for an actuator having a casing, a motor disposed within the casing and having a shaft rotatable about a central axis, and an output member drivably coupled with the motor shaft. The override device comprises a generally annular body with a central axis and including an outer annular rim extending circumferentially about the axis and engageable with the casing to couple the body with the actuator. An inner hub is disposed generally on the axis and has a socket configured to receive an end of the motor shaft, the outer rim being manually angularly displaceable to angularly displace the shaft about the shaft central axis and drive the output member when the hub is engaged with the shaft end.

In a further aspect, the present invention is an actuator assembly comprising an actuator having a casing, a motor disposed within the casing and having a shaft rotatable about a central axis, and an output member operatively coupled with the motor shaft. A generally annular override device includes a generally annular body having an outer portion engageable with the casing to couple the body with the actuator. An inner portion is engageable with the motor shaft such that angular displacement of the override body rotates the shaft about the shaft central axis and drives the output member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 6 is a broken-away, axial cross-sectional view of the override device and actuator, showing the override device coupled with the actuator casing;

FIG. 7 is another broken-away, axial cross-sectional view of the override device and the actuator, showing the override device engaged with the motor shaft.

DETAILED DESCRIPTION OF THE INVENTION

Figure 1:
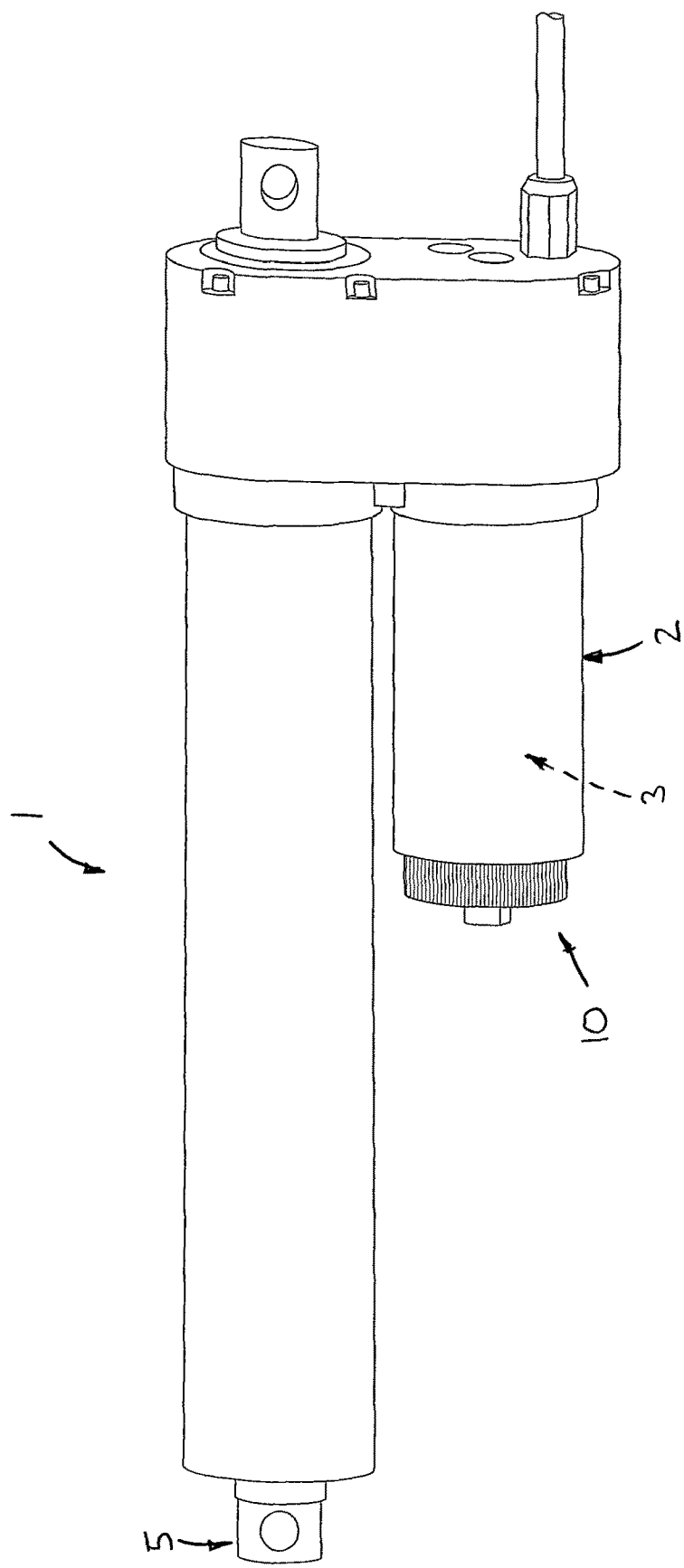
FIG. 1 is a side plan view of an actuator having an override device in accordance with the present invention.
Figure 2:
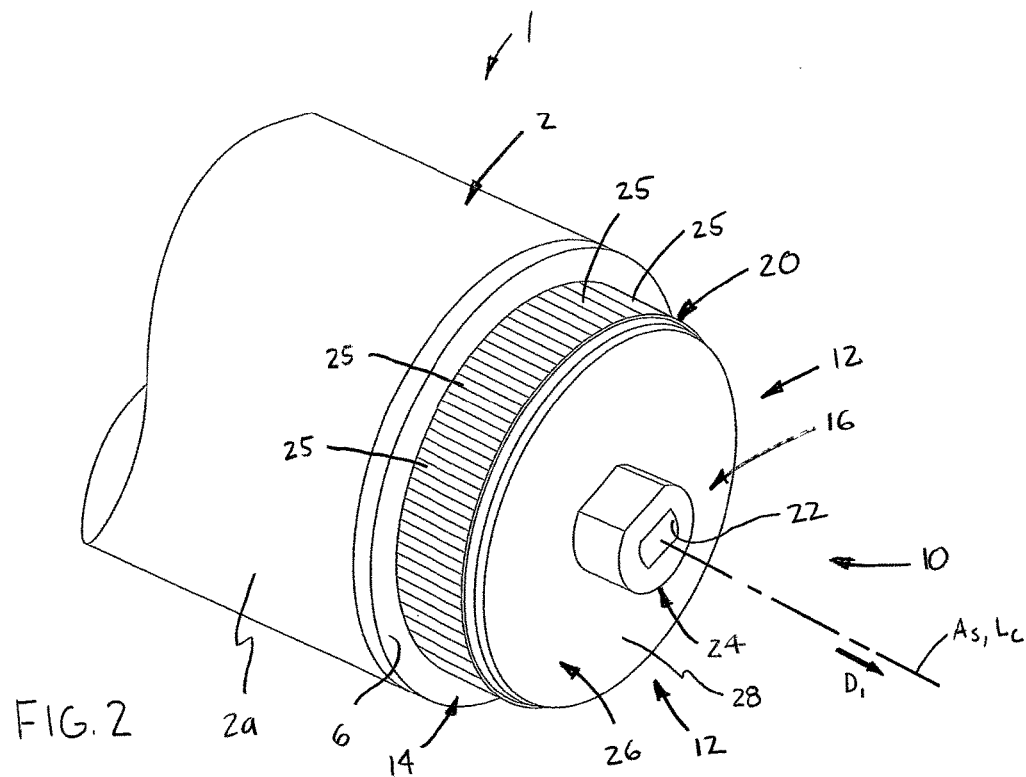
FIG. 2 is a broken-away, perspective view of the override device and actuator, showing the override device coupled with the actuator casing.
Figure 3:
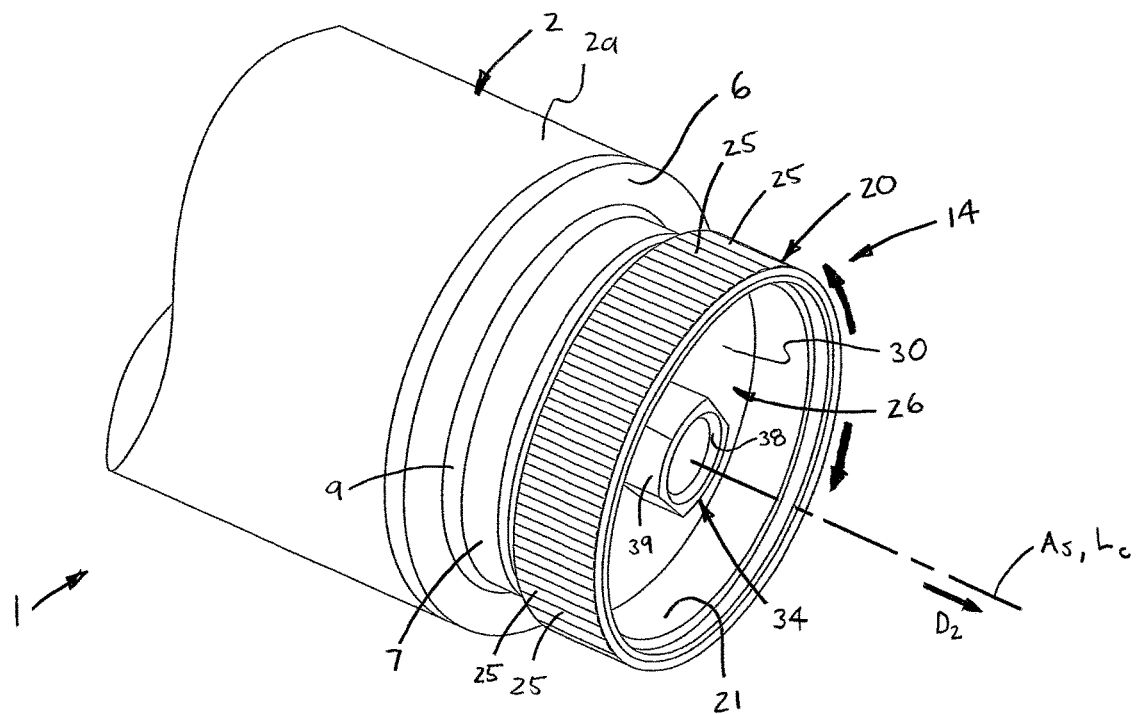
FIG. 3 is another broken-away perspective view of the override device and the actuator, showing the override device engaged with the motor shaft.
Figure 5:
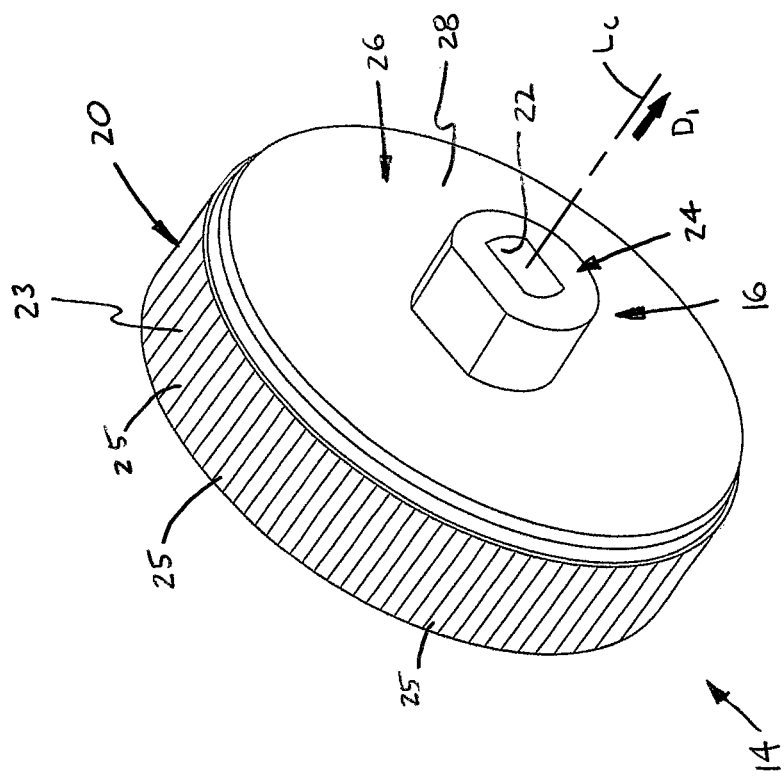
FIG. 5 is a perspective view from an outer end of the override device.
Figure 4:
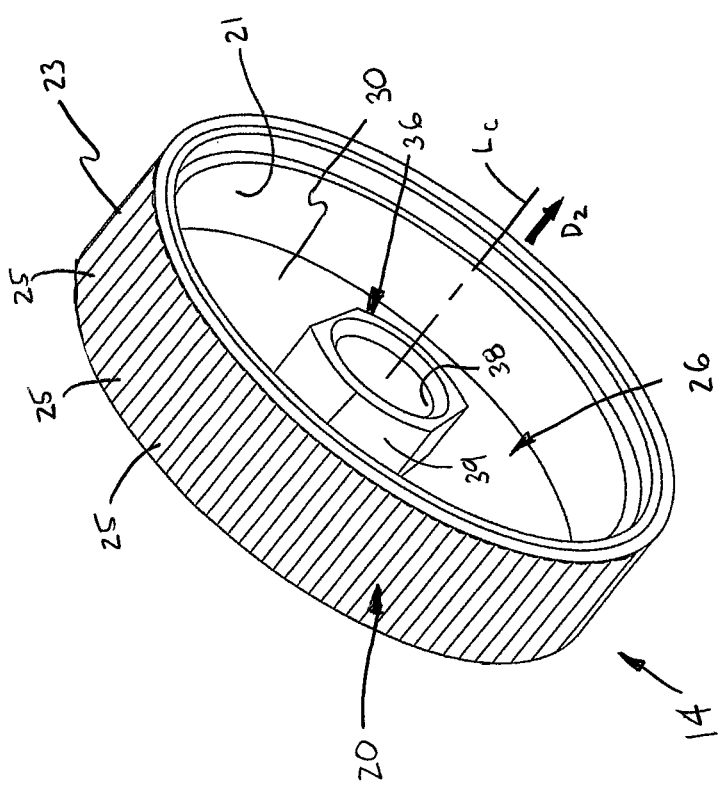
FIG. 4 is a perspective view from an inner end of the override device.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 an override device 10 for an actuator 1 having a casing 2, a motor 3 disposed within the casing 2 and having a shaft 4 rotatable about a central axis $A_S$, and an output member 5 drivably coupled with the motor shaft 4. The override device 10 basically comprises a generally annular override body 12 with a centerline $L_C$ and including an outer portion 14 engageable with the casing 2 and an inner portion 16 engageable with the motor shaft 4. The override body outer portion 14 couples the override body 12 with the actuator 1 when the override device 10 is used as a cover, as described below. Further, override body inner portion 16 is engageable with the motor shaft 4 such that angular displacement of the override body 12 angularly displaces the shaft 4 about the shaft central axis $A_S$ so as to thereby drive the output member 5. Thus, the override device 10 enables a user to readily reposition a "stuck" actuator output member 5 or a mechanism (not shown) operated thereby when there is an issue or failure with the motor 3.

More specifically, the override body outer portion 14 preferably includes a generally annular rim 20 having inner and outer circumferential surfaces 21, 23, respectively. The rim 20 is configured to be manually grasped and angularly displaced or "rotated" by a user when the body inner portion 16 is engaged with the shaft 4 so as to angularly displace the body 12. Such angular displacement/rotation of the override body 12 rotatably drives the motor shaft 4 in order to ultimately drive the output member 5, as discussed in further detail below.

Referring to FIGS. 6 and 7, the motor casing 2 preferably includes an end wall 6 with an opening 6a, through which extends an end portion 4a of the motor shaft 4 so as to permit engagement by the override device 10. When the override device 10 is not being used to drive the shaft 4, the override body 12 preferably encloses the casing opening 6a by coupling the body outer portion 12 with the casing 2. As such, the override device 10 also functions as a cover, as mentioned above and discussed in further detail below. Furthermore, the rim 20 preferably has a plurality of ridges 25 on the outer surface 23 that are spaced circumferentially about the body centerline $L_C$ and configured to facilitate manual angular displacement of the body 12, i.e., the ridges 25 increase friction to facilitate gripping of the rim 20.

Preferably, the actuator casing end wall 6 has a generally circular tubular projection 7 extending generally outwardly from an outer surface 6b of the end wall 6 and circumferentially about the central opening 6a. The projection 7 has an outer circumferential surface 8 which is frictionally engageable by the rim inner surface 21 so as to releasably couple the override body 12 with the casing 2, and thereby enclose the wall opening 6a, as best shown in FIG. 6. Further, the casing 2 preferably further includes a generally annular sealing member 8, preferably a conventional O-ring, disposed about an inner end 7a of the projection 7 so as to seal between the rim 20 and the casing projection 7.

Although the tubular projection 7 is preferably provided for releasably coupling the override body 12 with the casing 2, the override body 12 and/or the casing 2 may be constructed to couple the body 12 in any other appropriate manner. For example, the override body 12 may alternatively be sized so that the rim 20 frictionally engages with the outer circumferential surface 2a of the sidewall of the casing 2, with the casing 2 being formed without a tubular projection.

Referring now to FIGS. 2 and 5-8, the override body inner portion 16 preferably has a socket 22 configured to receive the end 4a of the shaft 4 so as to couple the body 12 with the shaft 4. The socket 22 is preferably generally rectangular and is configured to receive a shaft end 4a with opposing flats (not indicated), but may have any other appropriate shape as required to couple with any particular shaft end shape. Most preferably, the body inner portion 14 includes a central engagement hub 24 disposed generally on the body centerline $L_C$ and providing the socket 22. The outer portion rim 20 is spaced radially outwardly from the hub 24 and extends circumferentially about the centerline $L_C$.

Figure 8:
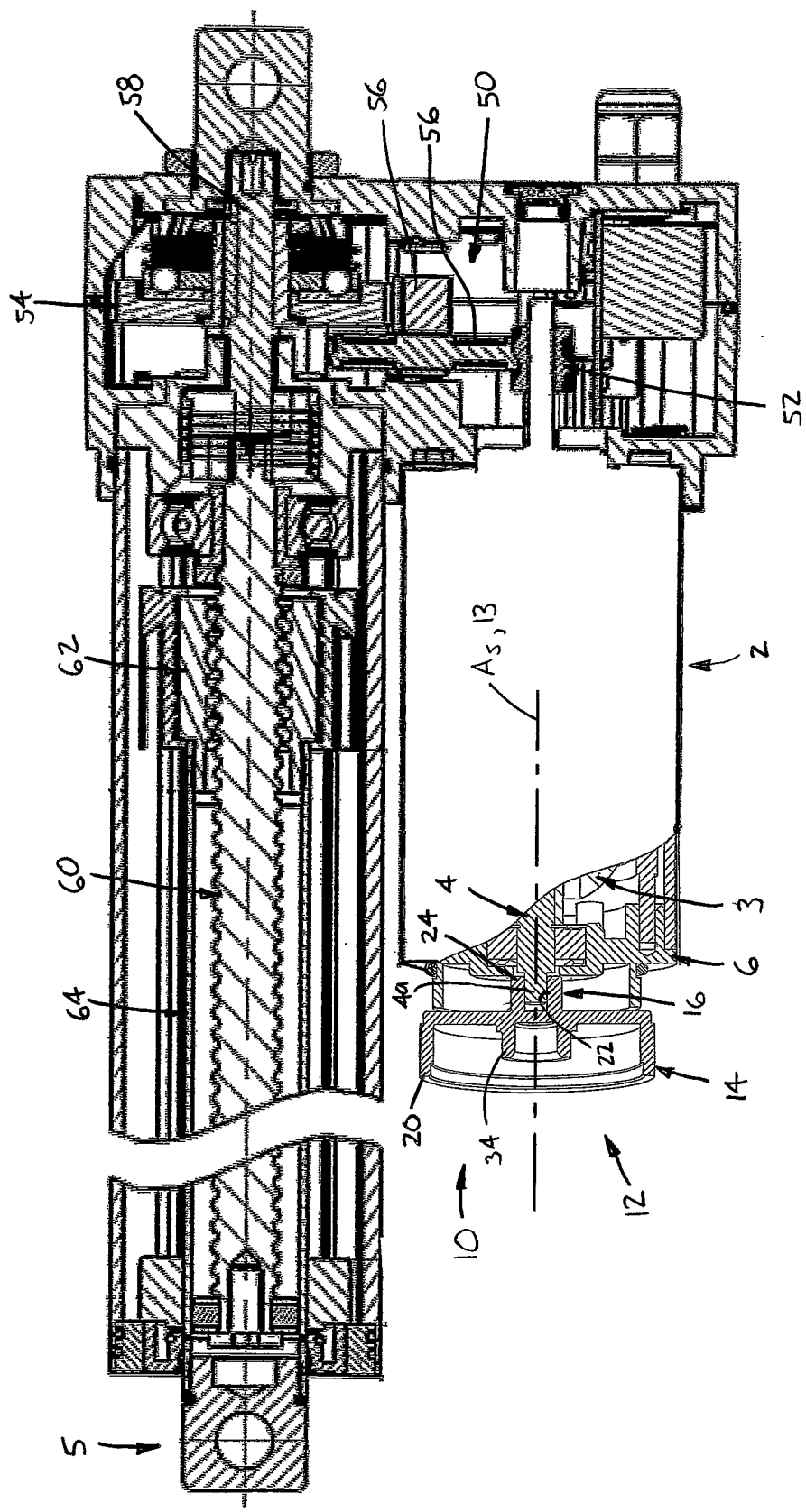
FIG. 8 is an axial cross-sectional view of an exemplary actuator and the override device, shown engaged with the motor shaft.

Referring to FIGS. 2-8, the override body 12 preferably also includes a generally disk-like intermediate portion 26 extending generally radially between and connecting the hub 24 with the rim 20. More specifically, the intermediate portion 26 is preferably generally circular and has opposing first and second radial surfaces 28, 30, respectively. The engagement hub 22 extends generally in a first axial direction $D_1$ from the intermediate portion first radial surface 28 and the rim 20 extends generally in a second, opposing axial direction $D_2$ from the intermediate portion second radial surface 30. Although the intermediate portion 26 is preferably relatively thin, as best shown in FIGS. 6-8, the intermediate portion 26 may alternatively be formed substantially axially thicker and incorporated with the body inner portion 16, such that the socket 22 is provided within a circular disk of relatively uniform thickness.

Preferably, the override body 12 further includes a clearance hub 34 extending generally in the second axial direction $D_2$ from the intermediate portion second radial surface 30 so as to be generally coaxially disposed within the rim 20. The clearance hub 34 has a bore 36 sized receive the shaft end 4a with clearance when the rim 20 is engaged with the casing 2. Further, an inner surface 38 of the clearance hub 34 which defines the bore 36 may be configured to be engageable by a tool, such as a power screw, to rotate the override body 12 when the engagement hub is connected with the shaft end 4a. For example, the inner surface 38 may have six flat sections (not depicted) so as to be engageable by a hex shaft of a tool (none shown) or the outer surface 39 may have six flats (none shown) so as to be engageable by a socket (not shown). However, the override body 12 may alternatively be formed without the clearance hub 34.

Referring particularly to FIG. 8, the actuator assembly 1 preferably further comprises a gear train 50 including an input gear 52 coupled with the shaft 4, and an output gear 54 coupled with the output member 5, and preferably one or more intermediate gears 56 coupling the input and output gears 52, 54. As such, angular displacement of the override body 12 angular displaces the shaft 4, the input gear 52, the one or more intermediate gears 56, and the output gear 54 so as to thereby drive the output member 5. In the depicted exemplary construction, the output gear 54 is mounted on a drive shaft 58 that is connected with a power or "lead" screw 60, and a drive nut 62 is threadedly engaged with the lead screw 60 and connected with a hollow shaft 64 providing a portion of the output member 5. However, the actuator assembly 1 may have any other gear train structure, or any other drive components, to operatively couple the motor shaft 4 with the output member 5.

In general use of the actuator assembly 1, the override device 10 remains coupled with the casing 2 by means of the outer portion rim 22 being frictionally engaged with the casing projection 7 on the casing end wall 6. When there is a need to drive the actuator assembly 1, the override body 12 is uncoupled from the casing 2 by pulling the rim 20 off of the casing projection 7. Then, the override body 12 is inverted or "turned over" such that the engagement hub 24 faces generally toward the actuator assembly 1 and the hub 24 is positioned adjacent to the shaft end 4a. The hub 24 is pushed onto the shaft 4 such that the shaft end 4a enters the socket 22 to releasably couple the override member 10 with the shaft 4.

At this point, the override body 12 is angularly displaced a number of rotations in the appropriate angular direction by gripping and turning the rim 22 until the output member 5 displaces a desired distance in a desired direction. In certain constructions, a manually operated tool or power tool (none shown) may be coupled with the clearance hub 34 and used to angularly displace the override body 12. In any case, by driving the motor shaft 4 as opposed to the lead screw 60 as with conventional override devices, the torque required to operate the actuator 1 with the override device 10 is substantially less. Finally, the override body 12 may be pulled off of the shaft end 4a and the rim 20 reengaged with the casing tubular projection 7 to store the device 10 and enclose the casing opening 6a.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. An override device for an actuator having a casing, a motor disposed within the casing and having a shaft rotatable about a central axis, and an output member drivably coupled with the motor shaft, the override device comprising:
a body having an outer portion engageable with the casing to couple the body with the actuator and an inner portion coaxially engageable with the motor shaft such that angular displacement of the override body angularly displaces the shaft about the shaft central axis so as to drive the output member.

2. The override device as recited in claim 1 wherein the override body outer portion includes a generally annular rim configured to be manually rotated by a user to angularly displace the body.

3. The override device as recited in claim 1 wherein the actuator casing has an opening, the actuator shaft extends at least partially through the opening and the override body encloses the casing opening when the body outer portion is coupled with the casing.

4. The override device as recited in claim 1 wherein the body inner portion has a socket configured to receive an end of the shaft so as to couple the body with the shaft.

5. The override device as recited in claim 1 wherein the override body is generally annular and has a central axis, the body inner portion includes a central engagement hub disposed generally on the central axis and having a socket for receiving an end portion of the motor shaft to couple the body with the shaft, the body outer portion includes a generally annular rim engageable with the actuator casing, spaced radially outwardly from the hub and extending circumferentially about the central axis.

6. The override device as recited in claim 5 wherein the override body further includes a generally disk-shaped intermediate portion extending generally radially between and connecting the hub with the rim.

7. The override device as recited in claim 6 wherein the disk-shaped intermediate portion has opposing first and second radial surfaces, the engagement hub extends generally in a first axial direction from the intermediate portion first radial surface and the rim extends generally in a second, opposing axial direction from the intermediate portion second radial surface.

8. The override device as recited in claim 7 wherein the body further includes a clearance hub extending generally in the second axial direction from the intermediate portion second radial surface so as to be generally coaxially disposed within the rim, the clearance hub having a bore sized receive the shaft end with clearance when the rim is engaged with the casing.

9. The override device as recited in claim 5 wherein the rim has an inner circumferential surface frictionally engageable with an outer circumferential surface of the actuator casing to couple the override device body with the actuator.

10. The override device as recited in claim 9 wherein the actuator casing has an opening, the actuator shaft extends at least partially through the opening and the override body encloses the casing opening when the rim is engaged with the casing outer surface.

11. The override device as recited in claim 5 wherein the outer portion rim has a plurality of ridges spaced circumferentially about the central axis and configured to facilitate manual angular displacement of the body.

12. An override device for an actuator having a casing, a motor disposed within the casing and having a shaft rotatable about a central axis, and an output member drivably coupled with the motor shaft, the override device comprising: a generally annular body with a central axis and including an outer annular rim extending circumferentially about the axis and engageable with the casing to couple the body with the actuator and an inner hub disposed generally on the axis and having a socket configured to receive an end of the motor shaft, the outer rim being manually angularly displaceable to angularly displace the shaft about the shaft central axis and drive the output member when the hub is engaged with the shaft end.

13. The override device as recited in claim 12 wherein the override body further includes a generally disk-shaped intermediate portion extending generally radially between and connecting the hub with the rim, the disk-shaped intermediate portion having opposing first and second radial surfaces, the engagement hub extending generally in a first axial direction from the intermediate portion first radial surface and the rim extending generally in a second, opposing axial direction from the intermediate portion second radial surface.

14. An actuator assembly comprising:
an actuator having a casing, a motor disposed within the casing and having a shaft rotatable about a central axis, and an output member operatively coupled with the motor shaft; and
a generally annular override device including a generally annular body having an outer portion engageable with the casing to couple the body with the actuator and an inner portion coaxially engageable with the motor shaft such that angular displacement of the override body rotates the shaft about the shaft central axis and drives the output member.

15. The actuator assembly as recited in claim 14 wherein the override body is generally annular and has a central axis, the body inner portion includes a central engagement hub disposed generally on the central axis and having a socket for receiving an end portion of the motor shaft to couple the body with the shaft, the body outer portion includes a generally annular rim engageable with the actuator casing, spaced radially outwardly from the hub and extending circumferentially about the central axis.

16. The actuator assembly as recited in claim 15 wherein the override body further includes a generally disk-shaped intermediate portion extending generally radially between and connecting the hub with the rim, the disk-shaped intermediate portion having opposing first and second radial surfaces, the engagement hub extending generally in a first axial direction from the intermediate portion first radial surface and the rim extending generally in a second, opposing axial direction from the intermediate portion second radial surface.

17. The actuator assembly as recited in claim 16 wherein the override body further includes a clearance hub extending generally in the second axial direction from the intermediate portion second radial surface so as to be generally coaxially disposed within the rim, the clearance hub having a bore sized receive the shaft end with clearance when the rim is engaged with the casing.

18. The actuator assembly as recited in claim 15 wherein the rim has an inner circumferential surface frictionally engageable with an outer circumferential surface of the actuator casing to couple the override device body with the actuator.

19. The actuator assembly as recited in claim 15 wherein the actuator casing has an end wall with a central opening, the actuator shaft extending at least partially through the opening, and a generally cylindrical projection extending generally outwardly from the end wall and circumferentially about the central opening, the projection providing a casing outer circumferential surface, the override body enclosing the casing opening when the rim is engaged with the casing cylindrical projection.

20. The actuator assembly as recited in claim 15 further comprising a gear train including an input gear coupled with the shaft and an output gear coupled with the output member such that angular displacement of the override member angular displaces the input gear and the output gear to drive the output member.

* * * * *